(12) United States Patent
Nachtrab et al.

(10) Patent No.: US 10,003,380 B2
(45) Date of Patent: Jun. 19, 2018

(54) CONNECTING ELEMENT FOR CONNECTING A FIRST DATA CABLE TO A SECOND DATA CABLE AND DATA LINE HAVING THE CONNECTING ELEMENT

(71) Applicant: LEONI KABEL GMBH, Nuremberg (DE)

(72) Inventors: Johannes Nachtrab, Windsbach (DE); Erwin Koeppendoerfer, Schwabach (DE); Rainer Poehmerer, Winkelhaid (DE); Dominik Dorner, Pleinfeld (DE); Michael Feist, Schwabach (DE)

(73) Assignee: LEONI Kabel GmbH, Nuremberg (DE)

( * ) Notice: Subject to any disclaimer, the term of this patent is extended or adjusted under 35 U.S.C. 154(b) by 0 days. days.

(21) Appl. No.: 15/337,125

(22) Filed: Oct. 28, 2016

(65) Prior Publication Data

US 2017/0126277 A1    May 4, 2017

(30) Foreign Application Priority Data

Oct. 28, 2015  (DE) .......................... 10 2015 221 089

(51) Int. Cl.
*H01R 13/40* (2006.01)
*H04B 3/02* (2006.01)

(52) U.S. Cl.
CPC ...................................... *H04B 3/02* (2013.01)

(58) Field of Classification Search
CPC .... H04B 3/02; H01R 13/648; H01R 13/6471; H01R 13/6461; H01R 13/02; H01R 13/6272; H01R 24/62; H01R 24/78; H01R 43/26; H01R 2201/18; H01R 2107/00; H01R 25/003
USPC .......... 375/257; 439/607, 55, 108, 490, 499, 439/497, 862, 101, 626
See application file for complete search history.

(56) References Cited

U.S. PATENT DOCUMENTS

| | | | |
|---|---|---|---|
| 6,196,880 B1 * | 3/2001 | Goodrich | H01R 13/6467 439/676 |
| 7,223,115 B2 * | 5/2007 | Hashim | H01R 4/245 439/403 |
| 9,209,570 B2 | 12/2015 | Toba et al. | |
| 2002/0028604 A1 | 3/2002 | Lo et al. | |
| 2007/0184725 A1 * | 8/2007 | Hashim | H01R 4/2433 439/676 |
| 2014/0242840 A1 | 8/2014 | Dang | |
| 2014/0335732 A1 | 11/2014 | Oberski et al. | |

(Continued)

FOREIGN PATENT DOCUMENTS

| | | |
|---|---|---|
| EP | 2219267 A1 | 8/2010 |
| EP | 2355258 A1 | 8/2011 |
| EP | 2650979 A1 | 10/2013 |

*Primary Examiner* — Jean F Duverne
(74) *Attorney, Agent, or Firm* — Laurence A. Greenberg; Werner H. Stemer; Ralph E. Locher (57) ABSTRACT

A data line includes a first data cable, a second data cable and a connecting element connecting the first and second data cables to one another. A connecting element interconnects a first parallel pair data cable and a second star quad data cable. The connecting element has multiple connecting lines which transition mutually adjacently disposed cores of a respective transmission pair of the first data cable to diagonally oppositely disposed cores of a transmission pair of the second data cable.

19 Claims, 3 Drawing Sheets

(56) References Cited

U.S. PATENT DOCUMENTS

2015/0207283 A1* 7/2015 Guitard .............. H01R 13/6272
439/370

* cited by examiner

CONNECTING ELEMENT FOR CONNECTING A FIRST DATA CABLE TO A SECOND DATA CABLE AND DATA LINE HAVING THE CONNECTING ELEMENT

CROSS-REFERENCE TO RELATED APPLICATION

This application claims the priority, under 35 U.S.C. § 119, of German Patent Application DE 10 2015 221 089.8, filed Oct. 28, 2015; the prior application is herewith incorporated by reference in its entirety.

BACKGROUND OF THE INVENTION

Field of the Invention

The invention relates to a connecting element for connecting a first data cable to a second data cable, and to a data line having such a connecting element.

A symmetrical transmission of a data signal is commonly used for high-frequency data transmission. In that case, the signal itself is transmitted in a first core and the signal which is inverted relative thereto is transmitted in an associated second core of a transmission pair. The two signals are evaluated at the receiver side and are summed and, in this case, external interferences that act on both signals cancel one another out.

Different types of data cables are known as data cables for such symmetrical transmissions of data. Firstly, it is commonly the case that the symmetrical signals are transmitted through a core pair which is equipped with a pair shielding. The symmetrical signals are therefore transmitted in the mutually adjacently situated cores of the core pair. The cores disposed in pairwise fashion normally run parallel to one another. Four cores are required for two high-frequency symmetrical signals. For that purpose, core pairs led in parallel (parallel pair) are normally used.

Furthermore, it is also known for symmetrical signals to be transmitted through a stranded assembly of multiple cores, wherein the pairing of a respective transmission pair is formed not by mutually adjacently disposed pairs but by typically diagonally oppositely situated pairs. Specific examples in that case include quad-stranded configurations, such as for example the so-called Dieselhorst-Martin quad or the star quad.

In the case of the Dieselhorst-Martin quad, two cores are stranded (twisted) so as to form a respective pair, and in a separate working step, a quad-stranded assembly is manufactured from the two pairs. The required decoupling of the signals is realized by way of different lay lengths, in the case of the Dieselhorst-Martin quad.

In the automotive field in particular, star quads are often used as transmission lines. The most commonly used system in that regard is referred to as the HSD system (High Speed Data System). That involves star-quad lines and a plug system adapted thereto. All observations made below apply not only generally to star-quad plugs and star-quad sockets but also to the commercially available HSD plugs and sockets. In the case of the HSD system, as is the case with all star-quad contacting systems, the symmetrical signals are fed in each case into the diagonals. Due to the mutually perpendicular fields, there is little influencing of the other pair. It is, however, necessary in that case for the diagonals not to be eliminated either in the cable or in the plug. The star-quad configuration is particularly preferentially used in that case due to its particularly space-saving and robust geometry.

In the automotive field, such quad-stranded assemblies are commonly used due to their relatively inexpensive manufacture and their good flexibility. The most commonly used system is the HSD system (High Speed Data System). Standardized plug systems exist for that system.

A special case in that regard is the parallel pair as already mentioned above. In that case, as in the case of the star quad, the four cores are disposed parallel to one another in the cable. However, the pairings are realized not across the diagonal but, as in the case of a stranded pair, adjacent one another. In that case, in order to decouple the high-frequency signals, the pairs running in parallel are in each case enclosed by a shield foil or a mesh or a helical shield. The self-contained, divided, conductive enclosure ensures very good near-end crosstalk (NEXT) and far-end crosstalk (FEXT). The alien near-end crosstalk and alien far-end crosstalk characteristics likewise benefit.

The different data cable systems cannot be combined with one another. A parallel pair cannot be simply connected to a star-quad plug or socket, because the high-frequency characteristics suffer due to the elimination of the pairings. A corresponding plug element for a parallel pair, despite the almost identical external dimensions, requires two shielded chambers which continue the shielding concept of the parallel pair into, for example, a printed circuit board in the plug element.

SUMMARY OF THE INVENTION

It is accordingly an object of the invention to provide a connecting element for connecting a first data cable to a second data cable and a data line having the connecting element, which overcome the hereinafore-mentioned disadvantages of the heretofore-known cables and lines of this general type, which permit a reliable symmetrical transmission of data and in which a high level of flexibility exists with regard to the data transmission concept.

With the foregoing and other objects in view there is provided, in accordance with the invention, a connecting element for connecting a first data cable to a second data cable that differs from the first. The first data cable in this case is, in particular, in the form of a parallel pair. The first data cable has two core pairs in each case having two cores disposed, in particular, mutually adjacently and in parallel, which cores form a transmission pair for a symmetrical transmission of data and are, in particular, provided with a pair shielding. In particular, the first data cable includes exactly two core pairs. The second data cable is, by contrast, in the form of a stranded assembly, in particular a quad-stranded assembly with four cores, which is preferably equipped with an overall shield surrounding the cores. In the case of the second data cable, diagonally oppositely situated cores each form one transmission pair for a symmetrical transmission of data. Specifically, the second data cable is a star quad. It is thus preferable for the two data cables to each have exactly two transmission pairs.

The connecting element is formed in the manner of an adapter element and has multiple connecting lines by way of which the mutually adjacently disposed cores of the transmission pairs of the first data cable are transitioned or connected to the diagonally oppositely disposed cores of the transmission pairs of the second data cable.

Thus, by way of the connecting element, a transition between two different data cable types within a connection path is made possible, thus altogether making it possible to construct and configure a data transmission system for symmetrical data signals in a simplified and more flexible manner. For example, components which are constructed for connecting shielded core pairs may, for data transmission purposes, be readily combined with stranded assemblies which, specifically in the automotive field, are used due to their high level of (bending) flexibility and their lower costs in relation to data cables shielded in a pairwise fashion. Thus, in general, by way of the connecting element, a respective transmission pair of one data cable is transitioned to a respective transmission pair of the other data cable. The initially parallel pairing is thus converted into a diagonal pairing and vice versa.

The connecting element in the form of an adapter element in this case normally has a length of only a few cm, for example at most 10 cm.

The connecting element is preferably in the form of a separate component. In this case, in particular, the connecting element is in the form of a plug, so that it can be easily connected to at least one of the two data cable types by way of a simple plug connection. For this purpose, a plug part is formed on a respective end side of the connecting element for forming the plug connection to a complementary plug part of the respective data cable. The connecting lines in this case are expediently disposed entirely within a (plug) housing of the connecting element. The housing may be either a plastics component or a metallic component. In the case of a metallic (or metalized) or generally conductive component for the plug housing, a shielding action is simultaneously realized.

In a first embodiment of the connecting element as a plug, a plug part is formed only at one end side of the adapter element, and a connector for the respective other data cable is formed at the other end side. In the assembled state, the transmission pairs of the other data cable are directly fixedly, that is to say non-detachably, connected at the other end side. This is realized for example by way of a soldered, crimped or other connection. In this case, there is then in particular a preassembled data cable of one type, to the end of which the connecting element is attached as a plug element, in such a way that a plug connection to a corresponding preassembled data cable of the other type can be readily formed.

In an alternative structural variant of the connecting element as a plug, the connecting element is formed in the manner of an adapter plug which thus has, at its two opposite end sides, plug parts of different types, in such a way that one end side is constructed for a plug connection to the first data cable and the opposite plug part is constructed for a plug connection to the second data cable.

The opposite plug parts in this case preferably have different constructions, and therefore have different plug faces. This, is however, not imperatively necessary. In the simplest case, the plug parts have a total of four plug terminals for the four cores of the respective data cable.

The plug parts in this case are expediently generally in the form of simple plug elements such as are found, in particular, in the automotive field. They are preferably compatible with commercially available plug elements specifically for parallel-pair data cables and for star-quad data cables, in particular HSD plugs.

For this purpose, the plug parts normally have an electrically conductive plug socket or an electrically conductive plug pin for each core. The plug parts are therefore different from plug elements used in the case of high-speed computer networks, for which it is common for a plug contact tongue to be provided for plug contacting purposes. Such a plug contact tongue is formed in the manner of a printed circuit board and is equipped with multiple mutually adjacently disposed terminal contacts.

With regard to a reliable and, in particular, interference-free transmission of data even in the region of the connecting element, it is provided, in an expedient refinement, that the overall shield is connected to the pair shields. The respective shielding of the two data cables is therefore also realized across the connecting element. The individual shields of the two data cables are therefore at the same (ground) potential.

In this case, it is expediently provided that the connecting lines are also shielded to the outside. The connecting lines are therefore, within the connecting element, at least partially and preferably entirely surrounded by a shield. For this purpose, it is for example the case that either the pair shields or the overall shield are or is continued in the connecting element and connected to the respective other shield of the other data cable. Alternatively or in addition, the connecting element itself has a shield, for example, in the form of a conductive housing or of a conductive, in particular sleeve-shaped shield element.

It is particularly preferable for the connecting lines to be in each case individually shielded. By way of such individual shielding, the pairings of the individual transmission pairs are, in effect, eliminated, in such a way that a respective connecting line can be laid arbitrarily within the connecting element, without the data transmission quality being adversely affected.

In a preferred structural variant, the connecting lines are in the form of crossing-over cores. This means that, within the connecting element, there is a number of cores which corresponds to the number of cores of the respective data cable. In particular, the connecting element thus has four cores. Due to the transitioning of the pairing in the shielded core pairs to the transmission pairs of the quad-stranded configuration, it is necessary for at least two cores to cross over. By way of this measure, a particularly inexpensive and simple embodiment is realized which is desired and used specifically in the automotive field.

With regard to a particularly reliable transmission of data, a respective connecting line is preferably in the form of a coaxial conductor which thus has an inner conductor which is initially surrounded by an insulator (dielectric) and thus forms a core. The dielectric in turn is concentrically surrounded by an outer conductor, also referred to as an outer shield. The coaxial conductor is thus also an individually shielded connecting line. The inner conductor is connected to a respective conductor of the data cable. In an expedient refinement, the outer conductor is then connected at one side to a respective pair shielding and at the other side to the overall shield.

As an alternative to this, the connecting lines are formed by the cores of one of the two data cables. The cores are thus continued within the connecting element.

In order to provide a particularly simple and inexpensive embodiment, it is the case in a preferred embodiment that an end region of one of the two data cables itself forms the connecting lines. This means that, in the end region of the respective data cable, the pairing is, in effect, eliminated, and two cores are crossed over. In this way, the pairing of the mutually adjacently situated transmission pairs are transitioned to the diagonally oppositely situated transmission pairs or vice versa. In this case, there is thus no need for a separate component. The connecting element in this case, in particular, is integrated into a plug of the respective data cable.

In this case, in a first embodiment, in an end region of the data cable, a cable sheath and the respective shielding of the data cable are removed, and the cores that have had the shielding removed form the connecting lines. These are in this case preferably not individually shielded. Due to the short distance, this is tolerable for certain fields of use.

As an alternative to this, it is advantageously the case that the shielding of the respective data cable is continued in the connecting element and is used for the individual shielding of the connecting lines. In this structural variant, it is thus the case that a reliable, secure transmission of data is ensured even in the connecting region, without additional shielding measures or additional components being required.

For this purpose, it is expediently the case that, in the first data cable, the pair shieldings are cut open, specifically in a parting plane between the two cores, in such a way that the respective (individual) core is assigned an, in particular, U-shaped partial shield. This therefore has a region which is open to one side.

In this case, it is preferable for at least a part of the cores with its partial shield to be twisted, specifically in the range from 30° to 110°, preferably in the range from 60° to 90°. By way of this measure, the partial shield can be twisted at a suitable position in such a way that efficient shielding is realized.

The cores are preferably twisted in such a way that the open regions of the partial shields are directed outward. By way of this measure, it is thus the case that good overall shielding is realized within the connecting element with the cut-open pair shields.

In a further structural variant for the embodiment of the connecting lines, they are in the form of conductor tracks of a printed circuit board. In particular, it is the case herein that two conductor tracks cross over. For this purpose, it is preferable for at least a part of the conductor tracks to be led on different planes of the printed circuit board, wherein individual conductor tracks are transitioned from one plane into the other plane using vias.

The printed circuit board is thus generally a multi-layer printed circuit board. The connection of the individual transmission pairs and the crossing-over are in this case realized by way of measures known per se from the field of printed circuit board technology.

In this case, it is expediently the case that the printed circuit board has, for example at its opposite end sides, terminal contacts to which the individual cores of the respective data cable can be or are connected. In this case, it is possible for the cores of one or both data cables to be directly connected to the terminal contacts by way of soldering, for example. It is alternatively also possible for the connection of at least one data cable, or else of both data cables, to be realized by way of a plug connection.

In this case, the printed circuit board furthermore has at least one ground connection for the pair shielding and at least one ground connection for the overall shielding. The two ground connections are in this case connected to one another, in such a way that the individual shieldings of the data cables are connected to one another in electrically conductive fashion and are at a common potential. In general, therefore, the printed circuit board preferably has one ground connection.

The printed circuit board preferably has at least one, and preferably two, opposite ground planes. A ground plane is, in particular, a conductive layer covering a full area. In the case of two opposite ground planes, the connecting lines are expediently led between the two ground planes. The shields of the data lines are preferably connected to one of the ground planes.

In general, the crossing-over of the connecting lines gives rise to different path lengths for a respective transmission pair. In a preferred embodiment, it is now the case that a compensation path is formed within the connecting element, in such a way that the path lengths of the cores for a respective transmission pair are adapted to one another and are, in particular, identical. This means that the relatively long path resulting from the crossing-over of one of the cores of a transmission pair is also lengthened in the case of the connecting line for the other core of the transmission pair.

In an expedient embodiment, it is provided for this purpose that the connecting element has an altogether angled form and is preferably in the form of an angled plug element. The different connecting lines are in this case expediently led in such a way that the compensation path is formed by way of the angled construction. In particular, it is provided in this case that the respective crossing-over connecting line (e.g. core with the thus lengthened path) is led on the inside, and that core which is led through normally, and which does not cross over, of a respective transmission pair is led on the outside, in the angled region. An automatic path length adaptation is thus realized in this way.

With the objects of the invention in view, there is concomitantly provided a data line having a first data cable and having a second data cable which are connected to one another by way of a connecting element according to the invention.

The connecting element described herein and the described data line having a connecting element of this type serve preferably for use in a transportation device on land, on water and/or in the air, such as for example in motor vehicles, aircraft, ships and boats, hovercraft, etc. The connecting element and the data line are used in particular in a motor vehicle.

Other features which are considered as characteristic for the invention are set forth in the appended claims.

Although the invention is illustrated and described herein as embodied in a connecting element for connecting a first data cable to a second data cable and a data line having the connecting element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
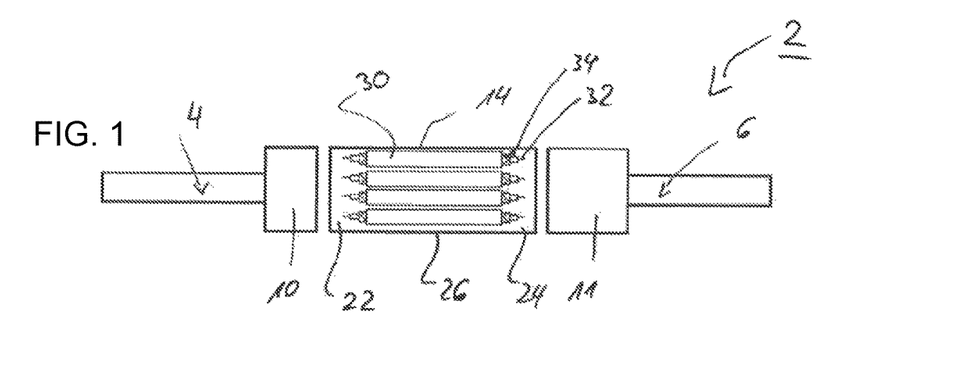
FIG. 1 is a diagrammatic, side-elevational view of a data line having two data cables of different types which are connectable to one another by way of a connecting element.

Referring now in detail to the figures of the drawings, in which parts having an identical function are denoted by the same reference designations, and first, particularly, to FIG. 1 thereof, there is generally seen a data line 2 having a first data cable 4 and a second data cable 6. In this case, the first data cable 4 is in the form of a so-called parallel pair with (exactly) two core pairs 4a, 4b (see also FIG. 2). Each core pair 4a, 4b in this case is surrounded by a respective pair shielding 8. The latter is furthermore normally also surrounded by a cable sheath. A first plug 10 is disposed on the end of the first data cable 4. The plug typically has an, in particular, metallic housing.

The second data cable 6 is a quad-stranded assembly (star quad) which likewise has two core pairs 6a, 6b. Individual cores 7 of a respective core pair 6a, 6b in this case are disposed diagonally with respect to one another. The total of four cores 7 is surrounded by an overall shield 12. In the exemplary embodiment of FIG. 1, the end of the second data cable 6 has a second plug 11, which likewise has, for example, a metallic housing.

Figure 2:
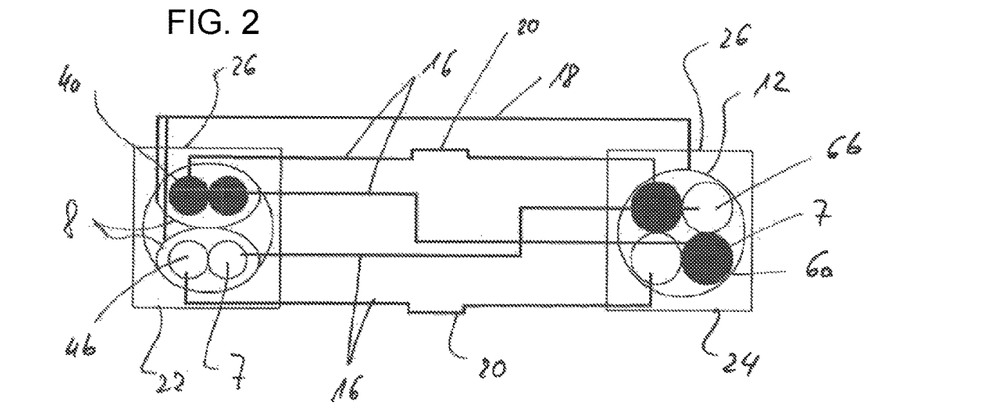
FIG. 2 is a simplified plan view of a connection layout in a connecting element for a connection of cores of a parallel pair to cores of a quad-stranded assembly.

The configuration of the individual cores 7 of the two data cables 4, 6 emerges, in particular, from the diagrammatic illustration of FIG. 2.

The data cables 4, 6 serve generally for the transmission of high-frequency data signals for high-speed data transmission of two symmetrical data signals. In FIG. 1, there is also provided a connecting element 14 for the connection of the two data cables 4, 6. The respective core pairs 4a, 4b; 6a, 6b, with their respective pairings, of the two data cables 4, 6 are transitioned to one another by way of the connecting element. The connection layout for this purpose can be seen from FIG. 2.

The connecting element 14 generally has connecting lines 16 by way of which the individual cores 7 of the two data cables 4, 6 are connected to one another. Due to the different pairings, it is necessary in this case for at least two of the connecting lines 16 to cross over (in this regard, see the two central connecting lines 16). Furthermore, a ground connection 18 is also formed, which electrically connects the pair shields 8 to the overall shield 12.

Furthermore, in FIG. 2, a compensation path 20 is also indicated in the two connecting lines that do not cross over. Due to the crossing-over connecting lines 16, the connecting lines have a lengthened path. In order to compensate for this path, the two connecting lines 16 that do not cross over are extended by the compensation path 20.

In FIG. 2, the configuration of the cores 7 of the first data cable 4 is illustrated in the left-hand half of the image, and the configuration of the cores of the second data cable 6 is illustrated on the right-hand side. The left-hand half of the image may in this case also be regarded as a plug face of a first plug part 22, and the right-hand half of the image may be regarded as a second plug part 24 of the connecting element 14 at the opposite end sides thereof.

In this case, the plug parts 22, 24 have in each case, or jointly, a plug housing 26 which is preferably composed of conductive material, in particular metal. The plug housing may alternatively also be composed of non-conductive material. In this case, the plug housing is, for example, metalized. In this way, overall, shielding to the outside is realized in the plug region. The two plug parts 22, 24 are compatible with the above-mentioned plugs 10, 11 of the first and second data cables 4, 6.

Figure 3:
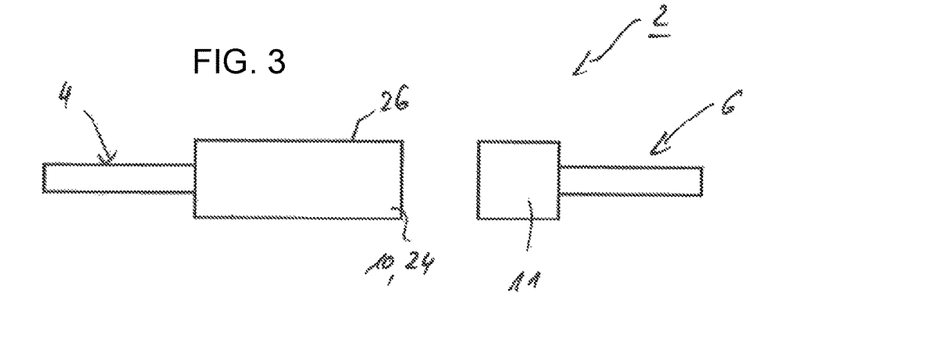
FIG. 3 is a side-elevational view of a structural variant in which the connecting element is an integral constituent part of a plug of the first data cable.

In FIG. 1, the connecting element 14 is illustrated as a separate component with each of the two plug parts 22, 24. Alternatively, it is also possible for the connecting element 14 to be integrated into the respective plug 10 of one of the two data cables 4, 6, as is diagrammatically illustrated in FIGS. 3 and 4. In this case, therefore, the cores 7 are transitioned from one pairing to the other pairing within the combined plug part 10, 24; 11, 22. If a combined second plug part 10, 24 is involved, as is illustrated in FIG. 3, the first data cable 4 is connected thereto, and the cores 7 of the parallel pair are transitioned for example to the plug face illustrated in the right-hand half of the image.

Figure 4:
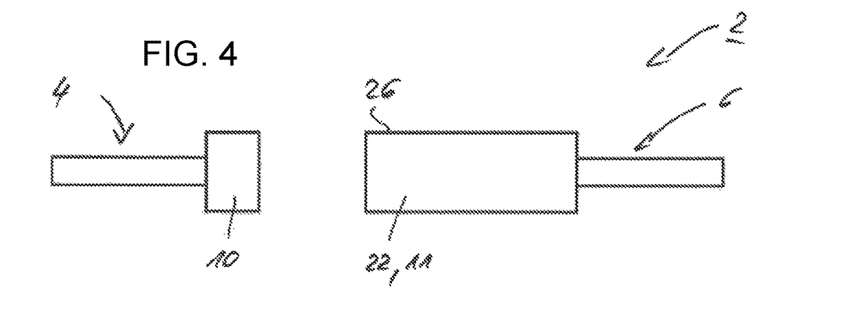
FIG. 4 is a view similar to FIG. 3, in which the connecting element is an integral constituent part of a plug of the second data cable.

In the structural variant of FIG. 4, the situation is reversed. There, within the combined first plug part 11, 22, the connected second data cable 6 with the quad-stranded configuration is transitioned, for example, to the plug face illustrated in the left-hand half of the image of FIG. 2.

In general, the connecting element 14 has a housing which is formed, for example, by the above-mentioned common plug housing 26.

The connecting lines 16 may be constructed in various ways.

With regard to a transmission which is reliable and interference-free as far as possible, it is basically sought in this case for the pairings of the individual core pairs 4a, 4b and 6a, 6b to be eliminated and, in effect, re-created.

For this purpose, it is provided in particular that the connecting lines 16 run within the connecting element 14 so as to be shielded with respect to one another as far as possible or, generally, a reliable potential reference of the respective connecting line 16 to a ground potential be realized. The shields (pair shielding 8, overall shield 12) are in this case normally connected to ground potential.

In a first structural variant, the connecting lines 16 are in the form of coaxial lines 30 which have an inner conductor 32 and an outer conductor 34. The coaxial lines 30 are indicated by way of example in FIG. 1. The outer conductor 34 in this case is typically formed by a shield layer, in particular a shield mesh, which surrounds a dielectric (plastic) with the inner conductor 32 led therein. In addition, in this case, each coaxial line 30 typically has an outer insulating sheath.

The respective inner conductor 32 in this case is electrically contacted in each case with a core 7. The respective outer conductor 34 serves for connecting the respective pair shield 8 to the overall shield 12. Through the use of the coaxial line 30, it is thus the case that each individual connecting line 16 is individually shielded. In this way, the pairings are eliminated, and interference is prevented.

In this structural variant with the coaxial lines 30, a separate housing 26 is not imperatively necessary. The coaxial lines 30 may also be combined in a simple manner and for example connected, at the end, to the first and the second plug parts 22, 24 for a respective plug connection to the first data cable 4 and second data cable 6.

Instead of coaxial lines 30 being used, simple cores are used, that is to say a conductor surrounded by a core insulation. In this case, the cores are preferably disposed in the housing 26. Alternatively, only the first and the second plug parts 22, 24 are attached, at the end, to the cores.

In an alternative embodiment, in particular in conjunction with, for example, the variants according to FIGS. 3 and 4, in particular in conjunction with FIG. 3, the cores 7 of a respective data cable 4, 6 are continued in the connecting element 14, and thus form the connecting lines 16. For this purpose, the cores 7 each have the cable sheath that is normally provided, and also the shielding (pair shielding 8 or overall shield 12), removed. In particular, the cable sheath is thus stripped, and the shields in the region of the connecting element 14 are removed. This is possible, in particular, in situations with relatively low demands with regard to transmission quality, because the cores 7 are unshielded only over a relatively short transmission path.

Figure 5A:
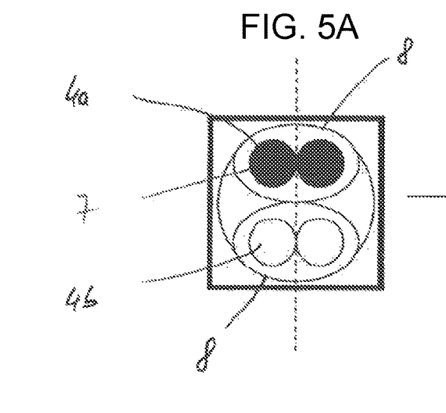
FIGS. 5A and 5B are plan views illustrating a connecting element in which the cores of the parallel pair are used as connecting lines wherein, in order to eliminate the pairings, the pair shields have been cut open and twisted.
Figure 5B:
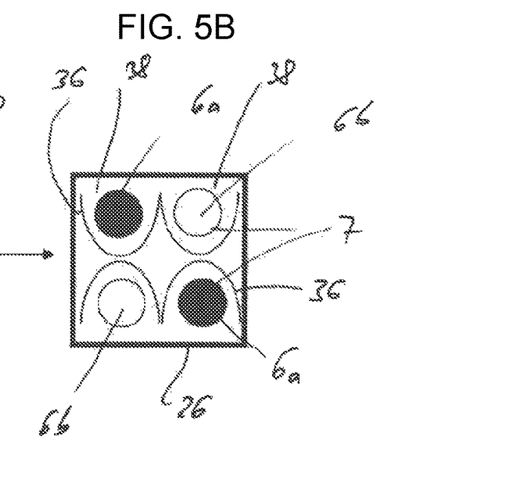

In a preferred embodiment, it is the case that the shield of the respective data cable 4, 6 is continued for the purposes of shielding within the connecting element 14. This will be discussed in more detail below, in particular in conjunction with FIGS. 5A and 5B:

Proceeding from the first data cable 4, the individual core pairs 4a, 4b are severed. Specifically, for this purpose, a respective pair shield 8 is severed in the middle, in such a way that two partial shields 36 are realized per core pair 4, 4a. These are in each case approximately U-shaped as viewed in cross section. The partial shields 36, or the respective cores 7 with their partial shield 36, are then preferably twisted through 90°, in such a way that an open region 38 of the respective partial shield 36 is oriented outward. Therefore, in the direction of a respective adjacent core 7, there is at least one part of one or more partial shields 36. The individual cores 7 are thus reciprocally shielded with respect to one another.

In this case, too, the connecting element 14 expediently has a housing 26 which forms a shielding to the outside. The open regions 38 are oriented toward the housing 26, in such a way that the open region 38 is thus shielded by the housing 26.

The cores 7 which are prepared in this way and which have the partial shields 36 are transitioned or converted, within the connecting element 14, from the core distribution illustrated in FIG. 5A to the core distribution illustrated in FIG. 5B.

Figure 6A:
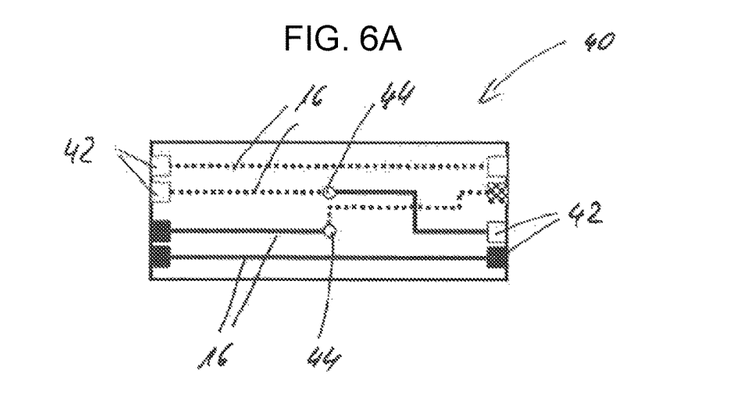
FIG. 6A is a simplified plan view of a printed circuit board on which the connecting lines are formed.
Figure 6B:
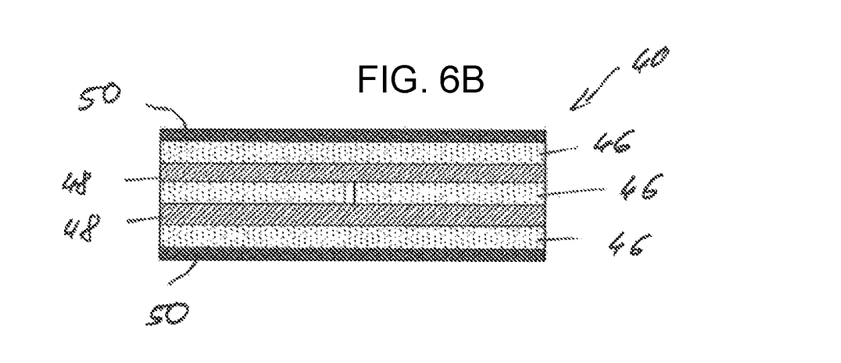
FIG. 6B is a side-elevational view of the multi-layer printed circuit board according to FIG. 6A.

In a further structural variant, the connecting lines 16 are formed as conductor tracks of a printed circuit board 40. A conductor track of this type is illustrated in FIGS. 6A and 6B. The printed circuit board is illustrated in a plan view in FIG. 6A and is illustrated in a side view in FIG. 6B. The printed circuit board 40 is a multi-layer printed circuit board, in which the connecting lines 16 are led in different layers or planes. The connecting lines 16 of one layer are illustrated as solid lines, and those of the other layer are illustrated as dotted lines.

The printed circuit board 40 furthermore normally has, on its opposite sides, terminal contacts 42 which are typically likewise disposed in different layers. In the exemplary embodiment of FIG. 6A, the left-hand side of the printed circuit board 40 is provided for the connection of the first data cable 4 or for the connection of two pairwise shielded core pairs 4a, 4b. The first core pair 4a in this case is disposed in one plane of the printed circuit board 40, and the other core pair 4b is disposed in the layer of the printed circuit board 40 situated underneath. The two middle connecting lines 16 are in each case crossed over and transitioned into the respective other plane for the transitioning of the pairing to the star-quad configuration. For this purpose, so-called vias 44, that is to say through-connections, are provided through an insulation layer 46. The contacting of the data lines 4 to the printed circuit board 40 is realized, for example, in a manner which is known per se. For this purpose, it is possible, on one hand, for the conductors of the cores 7 to be directly electrically contacted with the terminal contacts 42, for example by way of soldering. As an alternative to this, the terminal contacts 42 are suitably connected to a respective plug part 22, 24 or to a part thereof. This means that the printed circuit board 40 is optionally integrated in the separate connecting element 14, as illustrated in FIG. 1, or else in a combined plug part 10, 24 or 11, 22, as illustrated in FIGS. 3 and 4.

The multi-layer construction of the printed circuit board 40 is shown in FIG. 6B. As can be seen, a middle insulation layer 46 is disposed between two layers 48 with the connecting lines 16. The layers are in each case in turn followed by an insulation layer 46. Adjoining these, two ground planes or plates 50 are also formed, in such a way that the connecting lines 16 are enclosed between the two ground planes 50. By way of this measure, it is likewise the case that the respective pairing between the pairs 4a, 4b; 6a, 6b is eliminated. Each individual connecting line 16 is connected to the ground potential. The respective pair shielding 8 or the overall shield 12 is preferably connected indirectly or directly to the ground planes 50.

Figure 7:
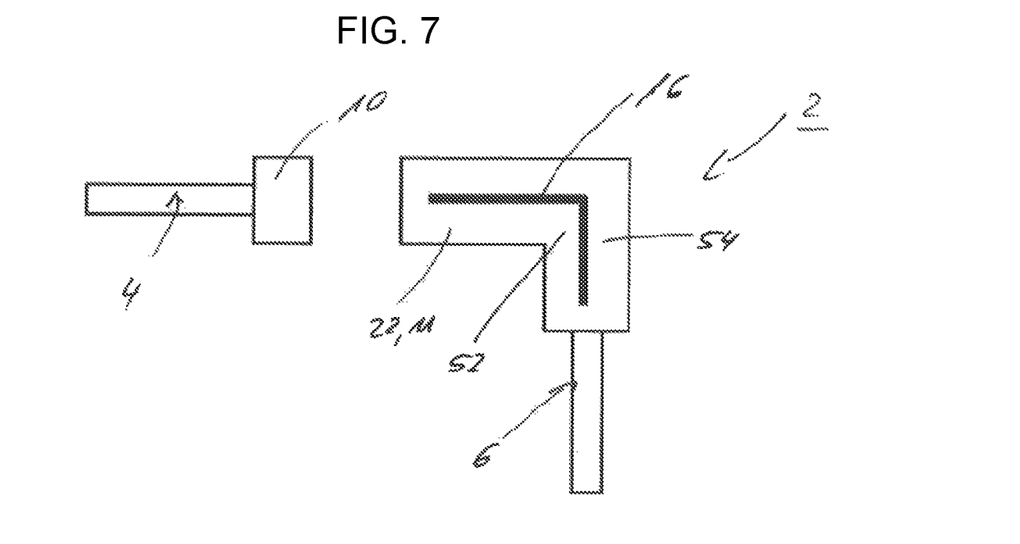
FIG. 7 is a side-elevational view of the two data cables with an angled plug connector.

Finally, FIG. 7 shows a structural variant in which the connecting element 14 has an angled form or shape. In this case, the angled profile of the connecting lines 16 is also illustrated in highly simplified and diagrammatic form. Due to the angled profile, an inner side 52 and an outer side 54 are formed. It is now preferably the case that the two crossing-over connecting lines 16 are laid on the inner side 52, and the non-crossing-over connecting lines 16 are laid on the outer side 54. This automatically yields an automatic compensation of the different path lengths.

The invention claimed is:

1. A data line, comprising:
a first data cable having two core pairs, each of said core pairs including two respective mutually adjacently disposed cores forming a transmission pair for a symmetrical transmission of data said two adjacently disposed cores defining a parallel pairing;
a second data cable being different than said first data cable, said second data cable having a quad-stranded assembly with four cores including diagonally oppositely disposed cores each forming a respective transmission pair for a symmetrical transmission of data said diagonally oppositely disposed cores defining a diagonal pairing; and
a connecting element for interconnecting said first data cable and said second data cable, said connecting element being an adapter element having a plurality of connecting lines, at least two of said connecting lines crossing over each other for eliminating the initial pairing and converting the parallel pairing into a diagonal pairing and vice versa and said mutually adjacently disposed cores of a respective transmission pair of said first data cable being guided to said diagonally oppositely disposed cores of a respective transmission pair of said second data cable.

2. The data line according to claim 1, which further comprises pair shieldings each shielding a respective one of said core pairs of said first data cable, and an overall shield shielding said transmission pairs of said second data cable.

3. The data line according to claim 1, wherein:
said connecting element has two mutually opposite end sides;
a first plug part is disposed on one of said end sides for a plug connection to one of said two data cables; and
a second plug part is disposed on the other of said end sides for a plug connection to the other of said two data cables.

4. The data line according to claim 1, wherein:
said connecting element has two mutually opposite end sides;
a plug part is disposed on one of said end sides for a plug connection to one of said two data cables; and
said other end side is constructed for a direct connection to the other of said two data cables.

5. The data line according to claim 2, which further comprises a ground connection for electrically connecting said pair shieldings of said first data cable to said overall shield of said second data cable.

6. The data line according to claim 1, which further comprises a housing formed of a conductive material for outwardly shielding said connecting element.

7. The data line according to claim 1, wherein said plurality of connecting lines are shielded with respect to one another.

8. The data line according to claim 2, wherein said connecting lines are coaxial conductors each including an inner conductor and an outer conductor, and said outer conductors each have one end connected to at least one of said pair shieldings and another end connected to said overall shield.

9. The data line according to claim 1, wherein said cores of one of said data cables at least partially form said connecting lines.

10. The data line according to claim 1, wherein said shieldings of said first data cable shield said connecting lines.

11. The data line according to claim 2, wherein said pair shieldings of said first data cable are divided centrally between said two cores of said core pair forming partial shields, and each of said cores is associated with a respective one of said partial shields each running partially around a respective one of said cores and having an open region.

12. The data line according to claim 11, wherein at least a part of said cores with a respective one of said partial shields is twisted to cause said open regions to be directed outward.

13. The data line according to claim 1, which further comprises a printed circuit board having conductor tracks forming said connecting lines.

14. The data line according to claim 13, wherein said printed circuit board has two opposite ground plates providing shielding, and said connecting lines are led between said ground plates.

15. The data line according to claim 1, wherein said at least two of said connecting lines have different path lengths for different transmission pairs, and a compensation path adapts said path lengths of said connecting lines of said different transmission pairs to one another.

16. The data line according to claim 15, wherein said compensation path makes said path lengths identical.

17. The data line according to claim 16, wherein said connecting element has an angled shape with an inner side, and said compensation path is formed by leading said crossing-over connecting lines on said inner side of said connecting element having said angled shape.

18. The data line according to claim 17, wherein said connecting element having said angled shape is an angled plug.

19. In a data line including a first data cable having two core pairs, each of the core pairs including two respective mutually adjacently disposed cores forming a transmission pair for a symmetrical transmission of data, the two adjacently disposed cores defining a parallel pairing, and a second data cable being different than the first data cable, the second data cable having a quad-stranded assembly with four cores including diagonally oppositely disposed cores each forming a respective transmission pair for a symmetrical transmission of data, the improvement comprising:
a connecting element for interconnecting the first data cable and the second data cable, said connecting element being an adapter element having a plurality of connecting lines, at least two of said connecting lines crossing over each other for eliminating the initial pairing and converting the parallel pairing into a diagonal pairing and vice versa and the mutually adjacently disposed cores of a respective transmission pair of the first data cable being guided to the diagonally oppositely disposed cores of a respective transmission pair of the second data cable.

\* \* \* \* \*